United States Patent [19]

Graetz

[11] 3,753,124

[45] Aug. 14, 1973

[54] MANUAL SET SYSTEM FOR SHIFT REGISTER

[75] Inventor: Ernest F. J. Graetz, Derry, N.H.

[73] Assignee: Parke Davis & Company, Detroit, Mich.

[22] Filed: Aug. 16, 1972

[21] Appl. No.: 281,075

[52] U.S. Cl. ................................ 328/37, 307/221 R

[51] Int. Cl. ............................................ G11c 11/00

[58] Field of Search .................... 328/37; 307/221 R

[56] References Cited

UNITED STATES PATENTS

| | | | |
|---|---|---|---|
| 3,151,252 | 9/1964 | Leightner | 307/221 R |
| 3,345,521 | 10/1967 | Leenhouts | 328/37 X |
| 3,348,069 | 10/1967 | Petschaurer | 328/37 X |
| 3,673,501 | 6/1972 | Zeph | 328/37 |

*Primary Examiner*—John S. Heyman
*Attorney*—James F. Powers, Jr. et al.

[57] ABSTRACT

The specific disclosure provides a manual set system for a shift register wherein a manually operable switch is moved to a first position to connect both CLEAR and PRESET input terminals of a flip-flop to an activation signal source consisting of either a logical 0 or a logical 1 signal. The switch has a second position for connecting both CLEAR and PRESET terminals to a deactivation signal source which generates either a logical 0 or a logical 1 signal opposite to that of the activation signal source. The circuit also comprises electrically conductive components in circuit between the deactivation signal source and one of the CLEAR and the PRESET input terminals for passively delaying initiation of the deactivation signal thereon. This delay of the deactivation signal latches a logical signal at the output terminal of the flip-flop when the deactivation signal is fully developed at the other of the CLEAR and PRESET input terminals.

8 Claims, 1 Drawing Figure

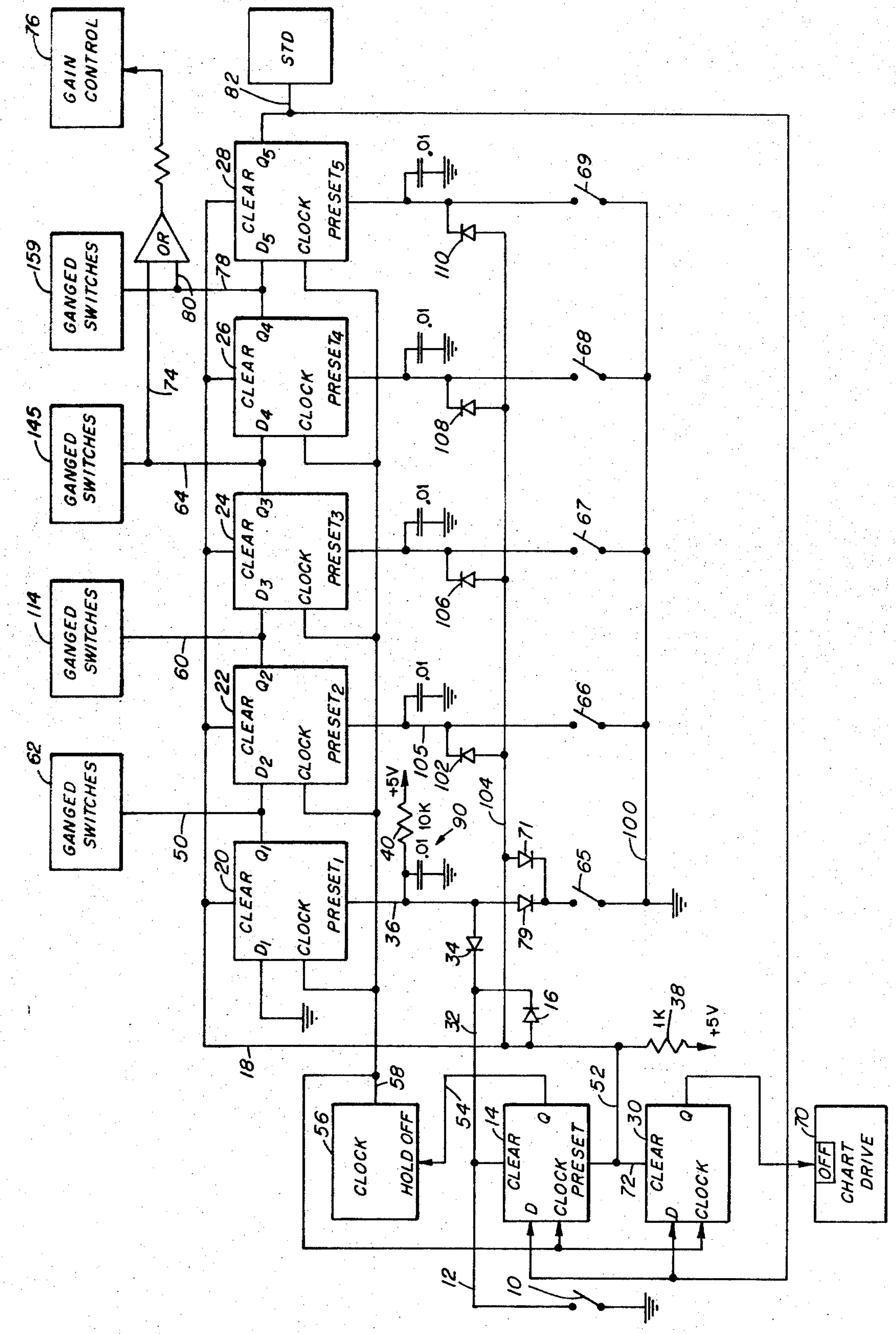
GAIN CONTROL
STD
GANGED SWITCHES
OR
CLEAR
CLOCK
PRESET
HOLD OFF
OFF
CHART DRIVE
+5V
10K
1K

MANUAL SET SYSTEM FOR SHIFT REGISTER

BACKGROUND OF THE INVENTION

The present invention relates to a system for manually setting an output signal in a shift register. More particularly, the present invention relates to a system for manually disabling automatic operation of a shift register, and for setting a predetermined output signal.

It is known to manually set a shift register. However, prior art systems for manually setting shift registers generally consist of sequentially generating signals such as manually pushing two buttons in sequence to clear a flip-flop and then preset the flip-flop.

SUMMARY OF THE INVENTION

The present invention provides for momentary manual actuation of a switch to generate a single activation pulse to enter both CLEAR and PRESET.

In accordance with the present invention, there is provided a manually operable switch having a first position for connecting both the CLEAR and the PRESET input terminals of a shift register flip-flop to an activation signal source. The activation signal source generates one of a logical 0 and a logical 1 signal. The switch is also manually operable to a second position for connecting both the CLEAR and the PRESET input terminals of the flip-flop to a deactivation signal source which generates the other of the logical 0 and logical 1 signals. Electrically conductive components are provided in circuit between the deactivation signal source and one of the CLEAR and the PRESET input terminals for passively delaying initiation of the deactivation signal thereon. This delay latches a logical signal at the output terminal of the flip-flop when the deactivation signal is developed at the other one of the CLEAR and PRESET input terminals. The latched logic signal at the output terminal is determined by the logic state of the activation signal applied to said one of the CLEAR and PRESET input terminals when the switch is in the first position.

BRIEF DESCRIPTION OF THE DRAWING

The FIGURE discloses a shift register having a manual set system in accordance with the present invention.

DESCRIPTION OF SPECIFIC EMBODIMENT

The FIGURE shows a schematic representation of a specific embodiment of the invention suitable for use in sequencing a multi-channel electrocardiograph (ECG). An electrocardiograph suitable for use with the specific embodiment of the FIGURE is disclosed in concurrently filed U.S. Patent Application Ser. No. 281074, filed Aug. 16, 1972 for Multiple Channel Electrocardiograph by Ernest F. J. Graetz. U.S. Patent Application Ser. No. 281074 is incorporated herein by reference.

With reference to the FIGURE, flip-flops 20 – 28 are connected as a shift register. Flip-flops 14 and 30 are provided for actuation of a clock 56 and an ECG chart drive 70, respectively. The flip-flops 14 and 20 – 30 can each be one-half of a DM5474/DM7474 (SN5474/SN7474) dual D flip-flop manufactured by National Semiconductor Corporation, Santa Clara, California. This dual D flip-flop is described in *Digital Integrated Circuits*, National Semiconductor Corp., May 1971.

Actuation of a normally opened start button 10 on a panel of an ECG acts to apply a ground by a lead 12 through a diode 16 and a lead 18 to CLEAR of flip-flops 20 through 28. The ground is also applied by a lead 32 through a diode 34 and a lead 36 to PRESET of the flip-flop 20, and a lead 72 to CLEAR of flip-flop 30. The Q-output of the flip-flop 20 is undefined while the start button 10 is in a depressed state. However, upon release of the start button 10 to the position shown, a positive voltage is applied through a resistor 38 to the lead 18 to charge the CLEAR of the flip-flop 20 to a logical 1 state. Simultaneously, another positive voltage is applied through a resistor 40 to the lead 36 to charge the PRESET of the flip-flop 20 to a logical 1. However, since the voltage on the lead 36 is passing through an RC circuit, the charge rate of the PRESET in the direction of the logical 1 state is at a slower rate than that of the CLEAR. Thus, CLEAR reaches a logical 1 state while the PRESET remains at a logical 0 state, and the Q-output of the flip-flop 20 is latched in a logical 1 state.

At this time in the sequence, a positive pulse is applied by a lead 50 to a ganged switch network 62 which acts to pass a predetermined plurality of signals representative of body potentials to a multi-channel electrocardiograph network (not shown).

Further, the ground to CLEAR of flip-flop 30 sets the Q-output to logical 0. Flip-flop 30 does not have a PRESET input, and therefore logical 0 is latched at the Q-output when the start button 10 is released to disable OFF of a chart drive 70. A strip chart (not shown) is thus moved to record the body potential signals passed by the switch network 62.

Actuation of the start button 10 to the closed position also applied a ground to CLEAR of the flip-flop 14, and through the diode 16 and a lead 52 to PRESET of the flip-flop 14. As described with flip-flop 20, the Q-output of the flip-flop 14 is undefined when the button 10 is closed. However, when the button 10 is opened, a positive voltage is applied through the resistor 38 and the lead 52 to PRESET of the flip-flop 14, and also through the diode 16 to CLEAR of the flip-flop 14. Since the signal applied to CLEAR through the diode 16 reaches logical 1 later than that applied to PRESET, the Q-output of the flip-flop 14 will be a logical 0. This logical 0 Q-output is applied to a lead 54 to remove the HOLD OFF of the clock 56. The clock then begins generating a pulse train having a predetermined time period, e.g., 2.5 seconds. The clock can be a standard relaxation oscillator such as a basic UJT pulse trigger circuit shown in SCR Manual, 5th Ed., G.E., 1972, p. 102.

The first pulse in the pulse train applied to a clock output lead 58 occurs approximately 2.5 seconds after the logical 0 is first applied to the HOLD OFF. The first pulse in the pulse train is applied by the lead 58 to the clock input of each one of the flip-flops 14 and 20 – 30. Application of the pulse to the clock input of the flip-flop 20 acts to shift the logical 1 Q-output of flip-flop 20 to the Q-output of the flip-flop 22. Since the Q-outputs of the flip-flops 22 – 28, 14 were at logical 0, the 'ogical 0 is also shifted to the Q-outputs of the subsequent flip-flops in the register and to the flip-flops 14 and 30.

Simultaneously, a ground at the DATA (D) input of flip-flop 20 is shifted to the Q-output to remove the pulse from the lead 50 and disable the ganged switch network 62. Further, a positive pulse is applied to a lead 60 to actuate a second ganged switch network 114 to a conducting state. The ganged switch network 114 acts to pass another predetermined plurality of signals representative of body potentials to the channels of the ECG for recording on the strip chart (not shown).

The second pulse in the pluse train applied to the clock inputs of the flip-flops 14 and 20 – 30 by the lead 58 acts to shift the logical 1 Q-output of the flip-flop 22 to the Q-output of the flip-flop 24. Since the D-input of the flip-flop 20 is grounded, the ground is effectively shifted to the Q-output of the flip-flop 20 to maintain it at a logical 0. Concurrently, the logical 0 Q-outputs of flip-flops 20, 24 and 26 are shifted to the Q-outputs of the subsequent flip-flops in the shift register. Further, the Q-output of flip-flop 28 is shifted to the Q-outputs of flip-flops 14 and 30 to thus maintain the disabled states of the HOLD OFF of the clock 56 and the OFF of the chart-drive 70. Thus, a signal is removed from the lead 60 to disable the switch network 114, and is applied to a lead 64 to actuate a third ganged switch network 145 and pass a plurality of chest potential signals for recording on the strip chart (not shown). The signal is also applied by a lead 74 to an OR-gate 308, a resistor 308′ and a gain control circuit 76 to reduce the amplitude of the chest signals.

In like manner, the third clock pulse applied to the lead 58 shifts the logical 1 Q-output of flip-flop 24 to the Q-output of flip-flop 26. The switch network is thus disabled and another ganged switch network 159 is placed in a conductive state to pass another plurality of chest signals for recording. The logical 1 Q-output of flip-flop 26 is also applied by a lead 80 to the gain control circuit 76 to reduce the amplitude of the chest signals passed by the switch network 159.

The fourth clock pulse on the lead 58 shifts the logical 1 Q-output of flip-flop 26 to the Q-output of the flip-flop 28. The switch network 159 is thus disabled and a standardization mode circuit (STD) is actuated for self-calibration of the ECG.

The fifth clock pulse shifts the logical 1 Q-output of flip-flop 28 to the Q-outputs of flip-flops 14 and 30. The STD circuit is thereby inactivated. Further, the HOLD OFF of the clock 56, and the OFF of the chart drive 70 are actuated to turn off the clock 56 and the chart drive 70. The ECG remains in this state indefinitely until a manual operation occurs, such as reactuation of the automatic start button 10.

In accordance with an aspect of the present invention, momentary actuation of any one of normally opened manual set switches 65 – 69 acts to place a logical 1 at the Q-output of the respective flip-flops 20 – 28 and to maintain the logical 1 Q-output until it is cleared by depressing any one of the others of the switches 65 – 69 or the start switch 10. For example, momentary actuation of the switch 65 acts to place a ground through a diode 71 to the lead 18 to CLEAR of all of the shift register flip-flops 20 – 28, to CLEAR of the chart drive flip-flop 30, and PRESET the flip-flop 14. The ground is also applied through a diode 79 to the lead 36, and PRESET of the flip-flop 20. When the spring-loaded switch 65 is returned to the open position, a positive signal is applied through the resistor 38, and the lead 18 to the CLEAR inputs of the register flip-flops 20 – 28. A positive voltage is also applied through a resistor 40 to PRESET of the flip-flop 20. Since there is an RC circuit 90 in the input circuit of PRESET, the CLEAR input of the flip-flop 20 begins development at a higher value than that of the PRESET input of the flip-flop 20. Thus, the signal generation at the CLEAR input of the flip-flop 20 reaches a logical 1 voltage threshold prior to the PRESET input to thereby latch a logical 1 at the Q-output of the flip-flop 20.

The logical 1 at the Q-output of flip-flop 20 is applied by the lead 50 to the ganged switch network 62 to pass the first plurality of body potential signals for recording on the ECG strip chart.

The ground applied to PRESET of flip-flop 14 when the switch 65 is actuated insures that a logical 1 is latched in the Q-output of the flip-flop 14 because a positive signal has been maintained at CLEAR by blocking diodes 16 and 34. The logical 1 Q-output actuates the HOLD OFF of the clock 56 to thus disable the clock 56. Further, the ground applied by the switch 65 to CLEAR of flip-flop 30 acts to latch a logical 0 at the Q-output of flip-flop 30 to disable the OFF of the chart drive 70, and thereby provide strip chart movement for recording the body potential signals being passed by the switch network 62.

As noted above, the signals passed by the switch network will continue to be recorded until one of the other manual set switches 66 – 69 or the start button 10 is actuated. For example, actuation of manual set switch 66 applies a ground from a lead 100 through a diode 102, a lead 104, and the lead 18 to the CLEAR inputs of flip-flops 20 – 28. The ground is also applied by the switch 66 to a lead 105 to PRESET of flip-flop 22. Since the positive signal applied through the resistor 40 is not affected by actuation of the switch 66, the Q-output of flip-flop 20 is latched with a logical 0 to disable the switch network 62 and thereby discontinue passage of body potential signals therethrough.

Further, actuation of the switch 66 does not affect a positive signal applied through the resistor 38, the lead 104, diodes 106 – 110 to PRESET of flip-flops 24–28. Thus, the Q-outputs of flip-flops 24 – 28 are latched at logical 0. Closure of the switch 66 also does not affect Q-outputs of flip-flops 14 and 30, and the clock 56 is maintained in a disabled state and the chart drive 70 continues to move the strip chart.

When the switch 66 is released to the position shown, positive signals are applied through the resistor 38, the lead 18 to CLEAR of flip-flop 22 and through the lead and the diode 102 to PRESET of flip-flop 22, Since the diode 102 acts as a voltage dropping component, the positive signal applied to CLEAR of flip-flop 22 begins development at a higher value than that of the PRESET. Thus, the signal generation at CLEAR of flip-flop 22 reaches a logical 1 voltage threshold prior to PRESET to thereby latch a logical 1 at the Q-output of flip-flop 22. This logical 1 Q-output is applied through the lead 60 to actuate the switch network 114 to a conductive state and pass the body potential signals applied thereto for recording. The signals passed by the switch network will continue to be recorded until one of the other manual set switches 65, 67 – 69 or the start button 10 is actuated. Actuation of one of manual set switches 67 – 69 will set a logical 1 at the Q-output of the corresponding flip-flop 24 – 28 in the same manner as that described hereinabove with reference to switch 66 and flip-flop 22.

The voltate drop across each of the diodes should not exceed the guaranteed logical 0 input voltage for the respective flip-flops. For example, the DM5474/CM7474 dual D flip-flop has a guaranteed logical 0 of 0.75 volts. When this flip-flop is used, the drop across the diodes should be less than 0.75 volts to permit the CLEAR and PRESET flip-flop inputs to fall to a guaranteed logical 0 whenever a ground is applied through a diode to a CLEAR or PRESET input.

Thus, the specific embodiment shown in the FIGURE requires only momentary actuation of a simple switch and a single pulse to enter both CLEAR and PRESET. Further, the embodiment requires merely a passive delay provided by one of the uncomplex RC circuit 20 and voltage dropping diodes 102 – 110 to delay initiation of a PRESET signal and thereby permit a CLEAR signal to reach a logical 1 threshold prior to the PRESET signal to selectively provide a desired logical 1 Q-output.

The embodiment shown in the FIGURE provides an activation signal source (line 100 ground) of logical 0 to CLEAR and PRESET of one of the shift register flip-flops 20 – 28 when one of the manual set switches 65 – 69 is closed. The DM5474/DM7474 dual D flip-flop is designed to generate a logical 1 Q-output signal when a logical 0 is applied to PRESET. Since CLEAR reaches logical 1 before PRESET after connecting CLEAR and PRESET to a deactivation signal source (resistor 38 or 40) of logical 1, the embodiment latched a logical 1 on the Q-output.

However, it is contemplated that the activation signal can be a logical 1 and that the deactivation signal can be a logical 0. In this alternative embodiment, the diodes should be reversed.

Further, it is contemplated that the electrically conductive components, RC network 90, and diodes 102, 106, 108 and 110 can be alternatively connected to the CLEAR inputs of the flip-flops 20 – 28 to cause the PRESET terminals to reach the deactivation signal level prior to CLEAR. Further, the activation signal can be either a logical 0 or 1 as defined by the direction of the diodes.

What is claimed is:

1. In a circuit comprising a clock, and a shift register having a plurality of serially connected flip-flops, each one of said flip-flops including a data input terminal, a clock input terminal, a clear input terminal, a preset input terminal and an output terminal, said clock periodically applying a clock signal to each one of the clock input terminals to pass the signal at the data input terminal to the output terminal of each flip-flop, the improvement comprising:

a manually operable switch having a first position for connecting both the clear and the preset input terminals of one of the flip-flops to an activation signal source generating one of a logical 0 signal and a logical 1 signal, said switch having a second position for connecting both the clear and the preset input terminals of said one flip-flop to a deactivation signal source generating the other of said logical 0 signal and said logical 1 signal, at least one electrically conductive component in circuit between said deactivation signal source and one of the clear and the preset input terminals of said one flip-flop for passively delaying initiation of the deactivation signal thereon to latch a logical signal at the output terminal of said one flip-flop when the deactivation signal is developed at the other of the clear and the preset input terminals, said latched logical signal at the output terminal being determined by the activation signal applied to said one of the clear and input terminals when said switch is in said first position, and means responsive to said switch in said first position for disabling said clock to preclude application of clock signals to the clock inputs of the flip-flops.

2. The circuit of claim 1 wherein said at least one electrically conductive component comprises an RC network.

3. The circuit of claim 1 wherein said at least one electrically conductive component comprises a diode.

4. The circuit of claim 1 wherein said manually operable switch and said at least one electrically conductive component are provided for each flip-flop in said shift register.

5. The circuit of claim 4 wherein said at least one electrically conductive component comprises an RC network for the first flip-flop and comprises a diode for the remaining flip-flops.

6. The circuit of claim 1 wherein said activation signal source is a logical 0, and said deactivation signal source is a logical 1.

7. The circuit of claim 6 wherein said at least one electrically conductive component is connected in circuit between said deactivation signal source and the preset input terminal of said one flip-flop.

8. The circuit of claim 1 further comprising electrocardiograph switch networks responsive to the output signals of said flip-flops for passing predetermined body potential signals for recording.

* * * * *